C. A. J. GINACA.
BELT FASTENER.
APPLICATION FILED FEB. 13, 1918.

1,268,451.

Patented June 4, 1918.

WITNESS
F. C. Fliedner

INVENTOR.
Camille A. J. Ginaca
BY
Strong & Townsend
ATTORNEYS

UNITED STATES PATENT OFFICE.

CAMILLE A. J. GINACA, OF HORNITOS, CALIFORNIA.

BELT-FASTENER.

1,268,451.  Specification of Letters Patent.  Patented June 4, 1918.

Application filed February 13, 1918. Serial No. 216,917.

*To all whom it may concern:*

Be it known that I, CAMILLE A. J. GINACA, a citizen of the United States, residing at Hornitos, in the county of Mariposa and State of California, have invented new and useful Improvements in Belt-Fasteners, of which the following is a specification.

This invention relates to a belt fastener.

One of the objects of the present invention is to provide a simple and cheaply manufactured fastener for uniting the ends of belting, such as is generally used for power transmission in connection with pulleys, said fastener being constructed to avoid a multiplicity of perforations and consequent weakening of the belt incident to the use of lacing and the like. Another object of the invention is to provide a fastener which can be quickly applied or removed and so flexible in construction that the belt joint may pass over small pulleys and still maintain close contact with the surface thereof. Further objects will hereinafter appear.

The invention consists of the parts and the construction and combination of parts as hereinafter more fully described and claimed, having reference to the accompanying drawings in which—

Figure 1:
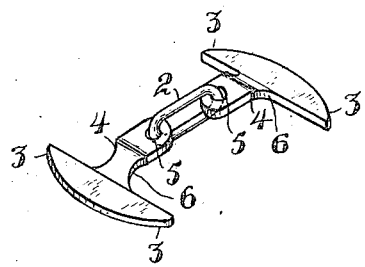
Figure 1 is a perspective view of the belt fastener.

Referring to the drawings in detail, A and B represent the ends of an endless flat belt, such as is generally used in transmitting power from one pulley to another. Formed in alinement a suitable distance from each end of the belt is a button-hole shaped opening. Adapted to be inserted in each button-hole opening is a fastener generally shown in Fig. 1.

Figure 2:
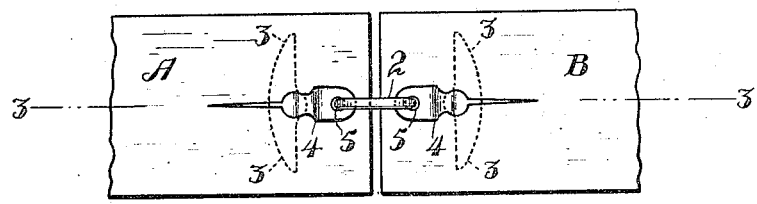
Fig. 2 is a plan view of a belt showing the application of the fastener.

This fastener consists of a pair of T-shaped members which are connected by means of a link 2, the cross arms 3 of each member being passed through the button-hole opening and turned at right angles, as shown in Fig. 2, to engage the under side of the belt while the legs 4 of each member extend upwardly through the button-hole openings to the upper side of the belt where they are connected by means of the link 2 which passes through perforations 5, one at the inner end of each leg member.

The link forms a connection between the fasteners which is so flexible that the belt joint can adhere to the surface of the smallest pulley, thereby materially increasing the efficiency of the belt as far as power transmission is concerned and also eliminating danger of breakage or parting of the belt which generally happens where ordinary fasteners are employed.

The fastener is, of course, particularly adapted for fan belts and the like which are used in connection with small pulleys and the advantage can readily be appreciated when it is considered that if a belt should part it can immediately be repaired by merely using a pocket knife and cutting a slit in the end of the belt to receive the fastener, this being true also if a new section of belt is to be inserted. Belt repairing, where lacing is employed, is rendered rather difficult if the required tools are not at hand, as it is first necessary to punch several perforations in the belt and then to lace it, thereby not only requiring a punching tool but also wire or proper lacing, such as a thin strip of rawhide. The lack of either may render repair impossible, thereby considerably delaying matters, a feature which is entirely overcome when a fastener of the character described is employed as lacing is not used nor are special tools required. The weakening of the belt is furthermore eliminated as it is only necessary to cut one slit in each end of the belt.

Figure 3:
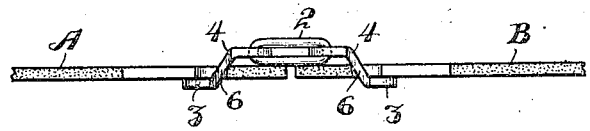
Fig. 3 is a section on the line 3—3 of Fig. 2.

For the purpose of permitting the cross arms of the fastener to lie as snug and flat against the inner side of the belt as possible I prefer to bend the leg members, as shown at 6 in Figs. 1 and 3. They therefore normally assume an angular position when inserted, thereby permitting the cross arms to lie snugly against the under side of the belt and the link snugly against the upper side of the belt. While the members are here shown substantially T-shaped, I wish it understood that this is not absolutely essential.

I also wish it understood that the materials and finish of the several parts may be such as the experience and judgment of the manufacturer may dictate.

Having thus described my invention, what I claim and desire to secure by Letters Patent is:

In a belt fastener, a pair of substantially T-shaped members, the heads of said members being flat and formed to lie flat against the under side faces of the belt ends, the legs of said members being disposed at an angle to the plane of the heads thereof and extending through the respective belt ends and having their end portions extending in a direction opposite to the direction in which the heads extend and substantially parallel to the respective belt ends whereby to provide an approximately Z-formation in side elevation, said ends of the legs of the members being perforated, and a link secured in said perforations of the legs, said ends of the legs being spaced from the outer faces of the belt ends a distance approximately equal to the thickness of the link.

In testimony whereof I have hereunto set my hand in the presence of two subscribing witnesses.

CAMILLE A. J. GINACA.

Witnesses:
H. G. GINACA,
ROBT. J. PRATT.

Copies of this patent may be obtained for five cents each, by addressing the "Commissioner of Patents, Washington, D. C."